(No Model.)

T. T. & E. BARBER.
WAGON JACK.

No. 270,924. Patented Jan. 23, 1883.

Witnesses
Howard B. Perry
H. F. Perry

Inventors.
Thomas T. Barber
Edward Barber
By their Atty.
John G. Perry

UNITED STATES PATENT OFFICE.

THOMAS T. BARBER AND EDWARD BARBER, OF HOPKINTON, R. I.

WAGON-JACK.

SPECIFICATION forming part of Letters Patent No. 270,924, dated January 23, 1883.

Application filed November 18, 1882. (No model.)

*To all whom it may concern:*

Be it known that we, THOMAS T. BARBER and EDWARD BARBER, of Hopkinton, Washington county, Rhode Island, have invented new and valuable Improvements in Wagon-Jacks, of which the following is a full, clear, and exact description, reference being had to the annexed drawings, making part thereof.

The object of this invention is to provide a simple and cheap implement for giving a limited vertical lift to a wagon axle and wheel or to other articles requiring a temporary support.

The distinguishing peculiarity of our device lies in the cramping action of a loose collar on the lifting-rod when lifted from one side only, and in the like action of a cross-bar when supported from one side only.

Figure 1:
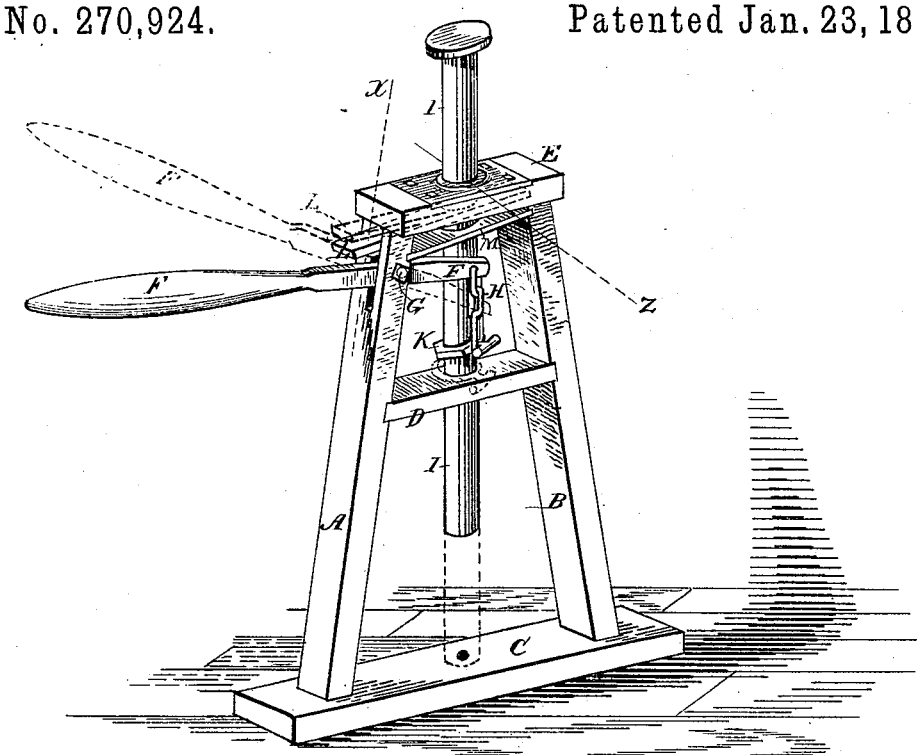
Figure 2:
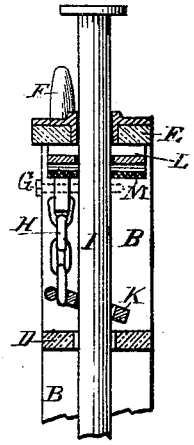
Figure 3:
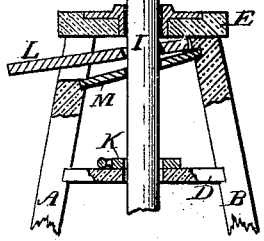

In the drawings, Figure 1 is a perspective view, showing the lifted position of the parts in full lines, and their position permitting the plunger to descend in dotted lines. Fig. 2 is a transverse section of the upper part of the device at the line *z* of Fig. 1. Fig. 3 is a section of same part at line *x*, showing the plunger supported by the oblique bar.

The implement has a strong frame, A B C D E, preferably of the A form shown.

F is the lifting-lever, pivoted at G in the frame, and provided at its short end with the connecting rod, link, or chain H.

I is the plunger or lifting rod, passing loosely through the horizontal top bar, E, and the middle bar, D, which serve as guides and maintain the rod I in vertical position. The top and bottom of this rod are sufficiently enlarged to prevent passing through the bars E and D, respectively. Between these two horizontal bars a loose collar, K, surrounds the plunger I. This collar has a hook or handle projecting at one side, to which is connected the lower end of the chain depending from the short arm of the lever F. When this arm is raised, by depressing the long arm of said lever, the collar is lifted obliquely, or from one side only, causing its corners to nip or bind on opposite sides of the plunger, as indicated in Fig. 2, and thus to seize and lift the plunger vertically.

Just beneath the top bar, E, is an oblique supporting-bar, L, perforated for the passage of the plunger I. This bar is supported at one end only by the frame, while its other end has a limited vertical play, and, being unsupported, drops down, as shown, until, being quite oblique to the plunger, the edges of the perforation nip the opposite sides of said rod and hold it supported at the height at which it has been raised. This permits one or more additional lifts by the lever, chain, and collar, the latter sliding freely downward on the rod I, when slackening of the chain deprives it of its support, but nipping or cramping and holding the rod at any upward movement. So when the rod is forced upwardly it will slightly raise the lowest end of the oblique bar L until its nip is overcome by said parts being nearly at right angles to each other, in which position the rod passes freely through said bar. The plunger is released, and its descent permitted by raising the lever, as denoted in dotted line, Fig. 1, until its upper edge or side strikes the lower outer end of the oblique bar L, and lifts it enough to relieve the nip or cramping action described in supporting the rod. The parts are so proportioned that this extreme elevation of the long arm of the lever permits the collar K to have a horizontal rest on the cross-bar D, so that the descent of the rod I is unobstructed. When, however, it is desired that the descent shall be gradual, the rod is engaged by the collar, with the hand of the operator on the lever. Then the nip of the cross-bar L is relieved by an upward movement, so that the plunger is free to descend slowly at the will of the person holding the lever, and the free end of the bar L may be dropped again to permit a new hold with the lever, chain, and collar, as desired. An oblique piece, M, prevents the short end of the lever from disturbing the operations of the cross-bar L.

We am aware that the principle of the sliding collar and rod is not broadly new, but, under a wholly different arrangement, has been utilized in stump-pullers. Hence we do not claim such principle.

Having thus described our invention, we claim—

The improved wagon-jack herein described, having a plunger with two distinct bearings in the frame to insure a vertical position and movement thereof, in combination with the lever, link, and gripping-collar K, and with the oblique bar L, supported from one end only, substantially as and for the purposes herein set forth.

THOMAS T. BARBER.
EDWARD BARBER.

Witnesses:
J. G. PERRY,
HOWARD B. PERRY.